US00RE46266E

(19) United States
(12) Reissued Patent
Matano

(10) Patent Number: US RE46,266 E
(45) Date of Reissued Patent: Jan. 3, 2017

(54) CHARGE PUMP CIRCUIT

(71) Applicant: PS4 LUXCO S.A.R.L., Luxembourg (LU)

(72) Inventor: Tatsuya Matano, Tokyo (JP)

(73) Assignee: Longitude Semiconductor S.A.R.L., Luxembourg (LU)

(21) Appl. No.: 14/025,518

(22) Filed: Sep. 12, 2013

Related U.S. Patent Documents

Reissue of:
(64) Patent No.: 8,018,270
Issued: Sep. 13, 2011
Appl. No.: 12/616,498
Filed: Nov. 11, 2009

(30) Foreign Application Priority Data

Nov. 13, 2008 (JP) ..... 2008-291068

(51) Int. Cl.
*G05F 1/10* (2006.01)
*H02M 3/07* (2006.01)

(52) U.S. Cl.
CPC ..... *H02M 3/073* (2013.01)

(58) Field of Classification Search
CPC ..... G11C 5/145
USPC ..... 327/536
See application file for complete search history.

(56) References Cited

U.S. PATENT DOCUMENTS 5,140,182 A * 8/1992 Ichimura ..... 327/536
5,969,988 A * 10/1999 Tanzawa et al. ..... 365/185.23
5,978,283 A * 11/1999 Hsu et al. ..... 365/189.09
6,137,344 A * 10/2000 Miki ..... 327/536
6,459,328 B1 * 10/2002 Sato ..... 327/536
6,972,973 B2 * 12/2005 Abe et al. ..... 363/60
2008/0205134 A1 * 8/2008 Kato ..... 365/185.2

FOREIGN PATENT DOCUMENTS

JP 2008-161014 A 7/2008

* cited by examiner

*Primary Examiner* — Anjan Deb

(57) ABSTRACT

A charge pump circuit includes a first plurality of capacitors, and a first precharge circuit. The first plurality of capacitors are connected in parallel to each other. The first plurality of capacitors receive clock signals to perform sequentially pumping operations which generate a first higher voltage from a power voltage supplied. The first precharge circuit precharges a predetermined number of capacitors in the first plurality of capacitors at the power voltage. The predetermined number is greater than one.

23 Claims, 6 Drawing Sheets

CHARGE PUMP CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention The present invention generally relates to a charge pump circuit. More specifically, the present invention relates to a charge pump circuit that improves power efficiency.

Priority is claimed on Japanese Patent Application No. 2008-291068, filed Nov. 13, 2008, the content of which is incorporated herein by reference.

2. Description of the Related Art

In recent years, LSI (large-scale integrated) circuits, such as semiconductor memory devices, have required multiple internal power voltages such as 3V, 5V, and 10V. In addition, in many cases, the LSI circuit requires a high voltage. Therefore, a charge pump circuit is used in order to boost a single external power voltage to generate a plurality of voltages.

The charge pump circuits are mainly classified into a parallel type, a serial type, and a serial-parallel type. For example, Japanese Unexamined Patent Application, First Publication, No. JP-A-2008-161014 discloses a serial-type charge pump circuit.

SUMMARY

In one embodiment, a charge pump circuit may include, but is not limited to, a first plurality of capacitors, and a first precharge circuit. The first plurality of capacitors are connected in parallel to each other. The first plurality of capacitors receive clock signals to perform sequentially pumping operations which generate a first higher voltage from a power voltage supplied. The first precharge circuit precharges a first predetermined number of capacitors in the first plurality of capacitors at the power voltage. The first predetermined number is greater than one.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

Before describing the present invention, the related art will be explained in detail with reference to FIG. 6, in order to facilitate the understanding of the present invention.

Figure 6:
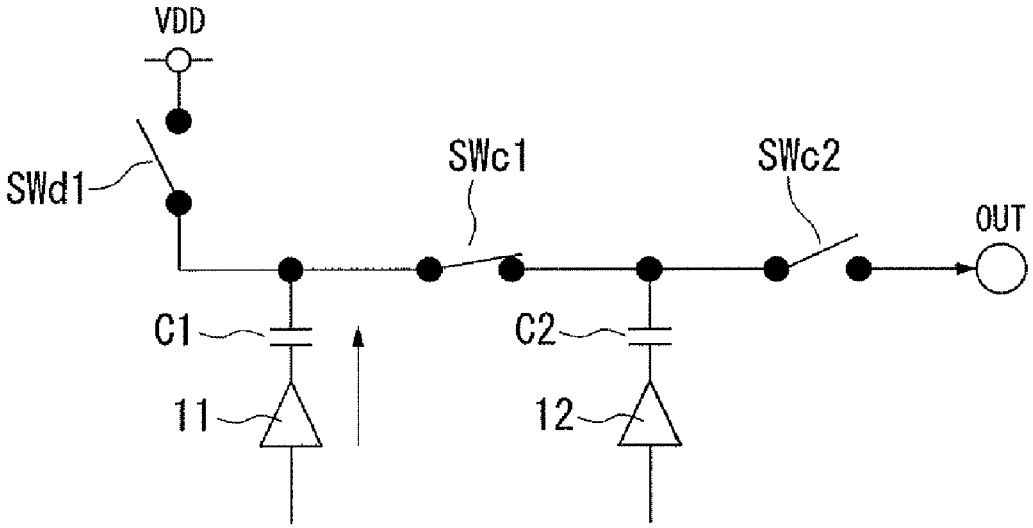
FIG. 6 is a circuit diagram illustrating the configuration of a charge pump circuit in accordance with the related art.

In addition, as the parallel-type charge pump circuit, a charge pump circuit having the structure shown in FIG. 6 has been proposed. The charge pump circuit shown in FIG. 6 is a parallel-type two-stage charge pump circuit that drives capacitors (capacitive elements C1 and C2) in parallel to generate a high voltage.

When the parallel-type charge pump circuit according to the related art generates an output voltage and a boosted voltage VPP (VPP<2×VDD) that is about two times (2×VDD) the power voltage VDD of a power supply supplied from the outside, first, a switch SWd1 is turned into electrically conductive state (ON state) and switches SWc1 and SWc2 are turned into electrically non-conductive state (OFF) to precharge (charge) a capacitive element C1 with the power voltage VDD. Then, the switches SWd1 and SWc2 are both turned into electrically non-conductive state (OFF) and the switch SWc1 is turned into electrically conductive state (ON state) to boost the voltage of the capacitive element C1 using a clock signal and a buffer circuit 11. Then, a capacitive element C2 is charged with the boosted voltage of the capacitive element C1 to perform charge pumping from the capacitive element C1 to the capacitive element C2. During a discharge, the switch SWc1 is turned into electrically non-conductive state (OFF) and the switch SWc2 is turned into electrically conductive state (ON state) to boost the voltage charged to the capacitive element C2 by the buffer circuit 12. Then, a current is output from an output terminal OUT. In the case of a parallel-type charge pump circuit having two or more stages, this operation is repeatedly performed from an input stage to an output stage.

As described above, in the charge pump circuit shown in FIG. 6, since the switch that pumps the voltage of the capacitive element C1 to generate a high voltage has low current efficiency, the voltage output from the capacitive element C1 through the switch SWc1, that is, the voltage charging the capacitive element C2, is low.

In addition, a precharge path that precharges the capacitive element C1 with the power voltage VDD is provided only for the capacitive element C1. For example, when the capacitive element C2 is precharged with the power voltage VDD, it is necessary to perform the precharge operation using the switch used for charge pumping from the capacitive element C1 to the capacitive element C2. However, the precharge path including the switch SWc1 is a high voltage generation precharge path and has low current efficiency (there is a large voltage drop). It is difficult to precharge the capacitive element C2 with high efficiency.

In the parallel-type charge pump circuit, as the number of stages of capacitive elements used for charge pumping is increased, the number of switches between the capacitive elements is increased, which results in low current supply efficiency. In addition, since a parallel-type unit in the serial-parallel-type charge pump circuit has the same structure as that shown in FIG. 6, it also has the same problems as those of the structure shown in FIG. 6.

The invention will be now described herein with reference to illustrative embodiments. Those skilled in the art will recognize that many alternative embodiments can be accomplished using the teaching of the present invention and that the invention is not limited to the embodiments illustrated for explanatory purpose.

In one embodiment, a charge pump circuit may include, but is not limited to, a first plurality of capacitors, and a first precharge circuit. The first plurality of capacitors are connected in parallel to each other. The first plurality of capacitors receive clock signals to perform sequentially pumping operations which generate a first higher voltage from a power voltage supplied. The first precharge circuit precharges a first predetermined number of capacitors in the first plurality of capacitors at the power voltage. The first predetermined number is greater than one.

In another embodiment, the apparatus a charge pump circuit may include, but is not limited to, a first charge pump circuit, a second charge pump circuit, and a third charge pump circuit. The first charge pump circuit may include, but is not limited to, a first plurality of capacitors that are connected in parallel to each other. The first plurality of capacitors receives clock signals to perform sequentially pumping operations which generate a first higher voltage from a power voltage supplied. The second charge pump circuit may include, but is not limited to, a second plurality of capacitors that are connected in parallel to each other. The second plurality of capacitors receive clock signals to perform sequentially pumping operations which generate a second higher voltage from the power voltage. The third charge pump circuit connects in series a first final stage capacitor on the final stage of the first plurality of capacitors to a second final stage capacitor on the final stage of the second plurality of capacitors. At least one of the first and second charge pump circuits may include, but is not limited to, a precharge circuit that precharges a predetermined number of capacitors at the power voltage. The predetermined number of capacitors are included in the at least one of the first and second charge pump circuits. The first predetermined number is greater than one.

In still another embodiment, a charge pump circuit may include, but is not limited to, a first switch connected between a first power line and a first node, a first capacitor connected between the first node and a first clock supply node, a second switch connected between the first node and a second node, a third switch connected between the first power line and the second node, a second capacitor connected between the second node and a second clock supply node, and a fourth switch connected between the second node and a third node.

In accordance with the embodiments, the charge pump circuit includes the precharge path that precharges a predetermined one or more capacitors with the power voltage. The predetermined one or more capacitors are included in the capacitors of the charge pump circuit. For example, when the charge pump circuit is the parallel-charge pump circuit, the precharge path precharges, with the power voltage, the first capacitor on the first stage and the second capacitor on the second or later stage.

The precharge path precharges the predetermined one or more capacitors from the power voltage without through any switch which is used for pumping the capacitors. This circuit configuration allows a highly efficient current supply to the predetermined one or more capacitors from the power supply.

The capacitors have already been precharged by the precharge path before pumping operations. The precharged capacitors are thus pumped from a pumping-start voltage level which is higher than the normal pumping-start voltage level of the charge pump circuit of the related art. The precharged capacitors can be pumped at a higher efficiency. The highly efficient pumping can easily generate a larger output voltage. Thus, the precharge path can improve the charge pump circuit in the ability of current supply for precharging and pumping the capacitors.

First Embodiment

Figure 1A:
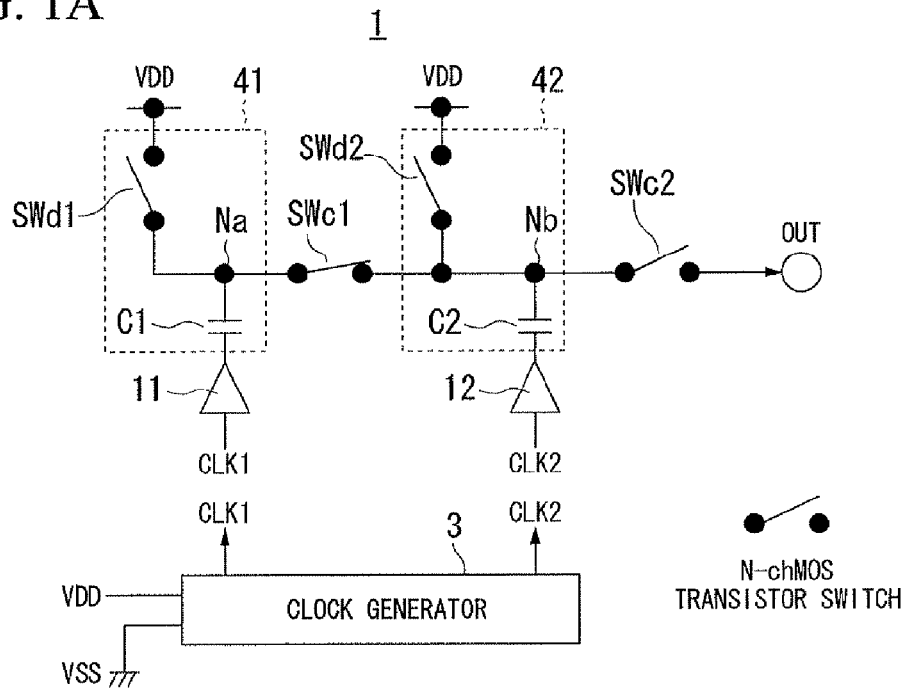
FIG. 1A is a circuit diagram illustrating the configuration of a two-staged charge pump circuit in accordance with a first preferred embodiment of the present invention.
Figure 1B:
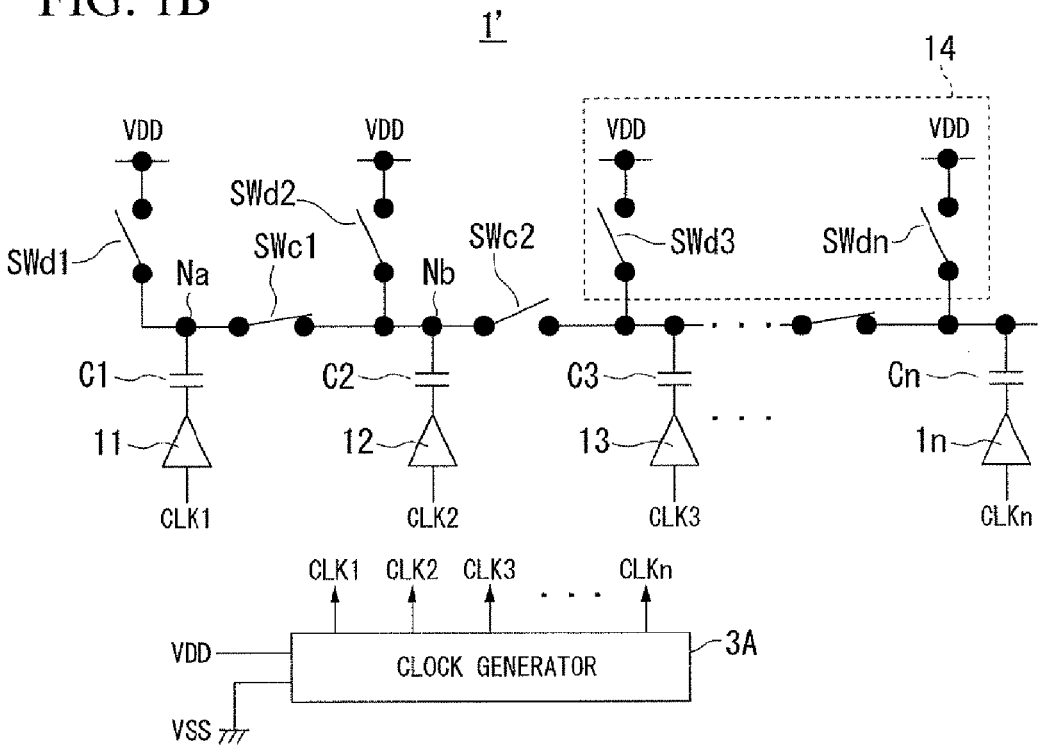
FIG. 1B is a circuit diagram illustrating the configuration of an n-staged charge pump circuit in accordance with a modified embodiment of the present invention.

FIGS. 1A and 1B are diagrams illustrating the structure of charge pump circuits according to a first embodiment of the invention.

A charge pump circuit 1 shown in FIG. 1A is an example of a parallel-type two-stage charge pump circuit, and a charge pump circuit 1' shown in FIG. 1B is an example of a parallel-type n-stage charge pump circuit.

The two-stage charge pump circuit 1 shown in FIG. 1A includes two voltage boosting capacitive elements C1 and C2, which are a plurality of capacitive elements, buffer circuits 11 and 12, and four switches SWc1, SWc2, SWd1, and SWd2. The switches SWc1, SWc2, SWd1, and SWd2 are semiconductor switches (N-chMOS transistor switches) composed of N-chMOS (N channel MOS) transistors. The capacitive element C1 and the capacitive element C2 have the same capacitance.

The capacitive element C1 performs as a first capacitor on the first stage of the plural stages. The first capacitor C1 is subjected to a first boosting. The first boosting is first one of the two boostings for all the capacitors C1 and C2 on all the stages, for example, the two stages. The first precharge path precharges the first capacitor C1 on the first stage at the power voltage.

The capacitive element C2 performs as a second capacitor on the second stage that follows to the first stage on which the capacitor C1 is provided. The second capacitor C2 is subjected to a second boosting which is later than the first boosting for the capacitor C1. The second boosting is second one of the two boostings. The second precharge path precharges the second capacitor C2 on the second stage at the power voltage.

If the number of stages is greater than two, then the first precharge path precharges the first capacitor C1 on the first stage at the power voltage by the first boosting. The first boosting is first one of the three or more boostings for all the capacitors on all the stages, for example, the three or more stages. In some ceases, a second precharge path precharges a second capacitor on a follower stage at the power voltage. The follower stage is a second or later stage. The second capacitor is thus provided on the follower stage that is included in the other stages than the first stage. In other cases, the later precharge paths sequentially precharge other capacitors than the first capacitors. The other capacitors than the first capacitors are provided on other stages that sequentially follow to the first capacitor.

Figure 2:
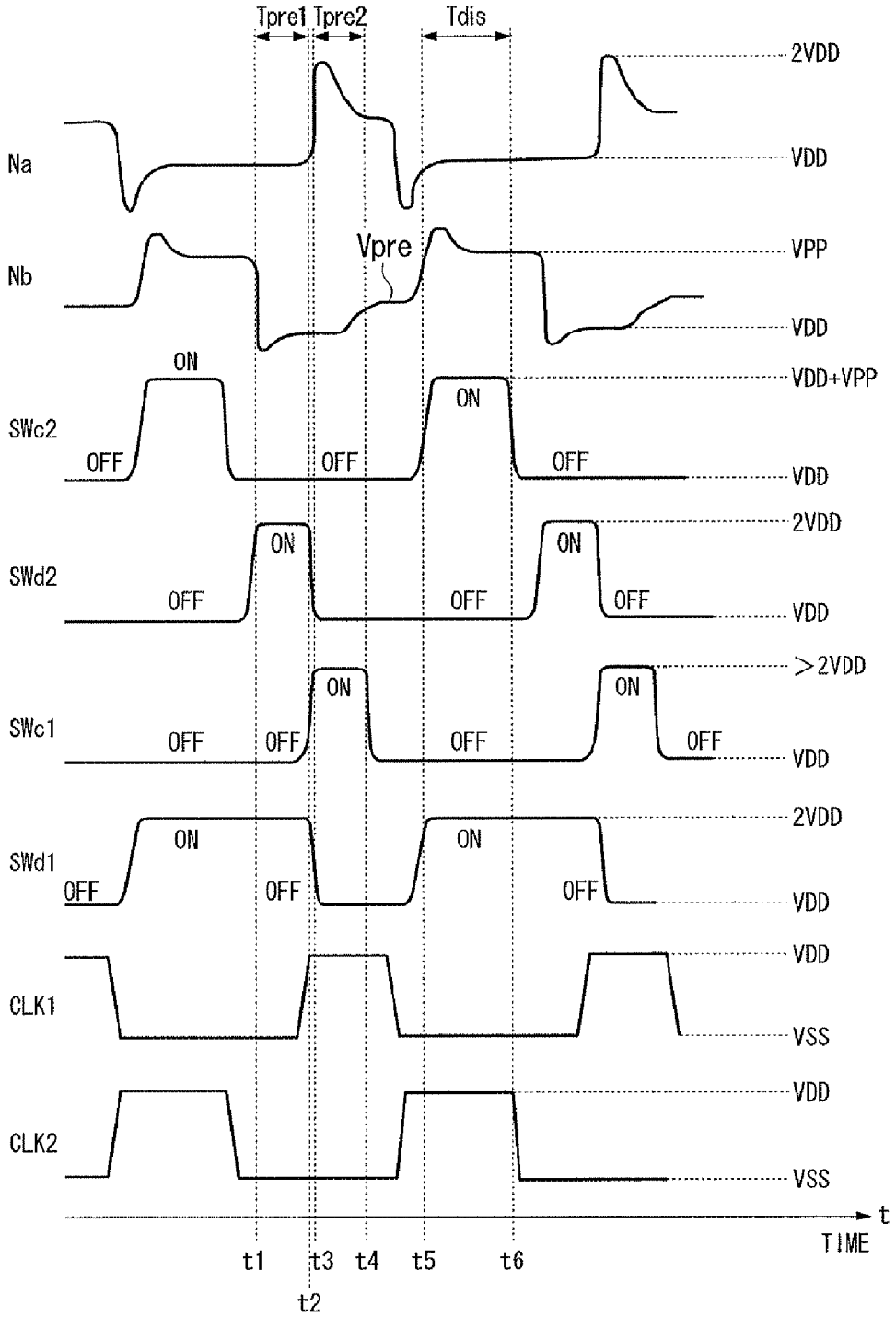
FIG. 2 is a timing chart illustrating operations of the charge pump circuit of FIG. 1A.

The charge pump circuit 1 further includes a clock generating unit 3 that generates clock signals CLK1 and CLK2. The clock generating unit 3 receives a power voltage VDD and a ground voltage VSS and outputs the clock signals CLK1 and CLK2 having an "H" level (high level) equal to the voltage level of the power voltage VDD. The waveforms of the clocks CLK1 and CLK2 are shown in FIG. 2.

A node Na, which is one end of the capacitive element C1, is connected to the power voltage VDD of an external power supply through the switch SWd1, and the other end of the capacitive element C1 is connected to an output terminal of the buffer circuit 11.

The clock signal CLK1 is input to an input terminal of the buffer circuit 11.

The node Na of the capacitive element C1 is connected to one end (node Nb) of the capacitive element C2 through the switch SWc1. The other end of the capacitive element C2 is connected to an output terminal of the buffer circuit 12. The clock signal CLK2 is input to an input terminal of the buffer circuit 12.

The node Nb is connected to the power voltage VDD of the external power supply through the switch SWd2. In addition, the node Nb is connected to an output terminal OUT through the switch SWc2.

As shown in FIG. 1A, the charge pump circuit 1 according to the first embodiment is a parallel-type two-stage charge pump circuit, and includes a precharge path that simultaneously charges the capacitive elements C1 and C2 with the power voltage VDD. The precharge path includes a first precharge path 41 including the switch SWd1 that charges the capacitive element C1 with the power voltage VDD and a second precharge path 42 including the switch SWd2 that charges the capacitive element C2 with the power voltage VDD.

Next, the operation of the charge pump circuit 1 will be described with reference to FIG. 2 and FIGS. 3A to 3C. Here, the operation of the two-stage charge pump circuit 1 shown in FIG. 1A will be described.

FIG. 2 is a timing chart illustrating the operation of the charge pump circuit shown in FIG. 1A. As shown in FIG. 2, in the charge pump circuit, three operation periods, that is, an initial precharge period Tpre1 (from a time t1 to a time t2), the next precharge period Tpre2 (from a time t3 to a time t4), and a discharge period Tdis (from a time t5 to a time t6) are repeated to perform a voltage boosting operation.

In this embodiment, in the operation of the charge pump circuit 1, a stage in which precharging is performed with the power voltage VDD is referred to as the initial precharge period Tpre1, and a stage in which pumping is performed (the rear-stage capacitive element is precharged with a boosted voltage output during pumping) is referred to as the next precharge period Tpre2.

In this embodiment, the term 'precharge' includes 'a case in which the capacitive element is charged with the power voltage VDD' and 'a case in which the capacitive element is charged with the boosted voltage output from the front-stage capacitive element during pumping'. Therefore, when it is necessary to clearly discriminate between the two cases, the former case is referred to as 'precharge with the power voltage VDD' and the latter case is referred to as 'precharge by pumping'.

The timing chart shown in FIG. 2 shows the waveform of the voltage of the node Na of the capacitive element C1 and the waveform of the voltage of the node Nb of the capacitive element C2.

FIG. 2 also shows the electrically conductive/non-conductive states (ON/OFF states) of the switch SWc2. A voltage (VDD+VPP) and the power voltage VDD shown on the right side of FIG. 2 indicate the voltage levels of the signals applied to the gate of the switch SWc2 in order to turn the switch SWc2 into electrically conductive/non-conductive states (ON/OFF states). That is, the voltage (VDD+VPP) is applied to the gate of the switch SWc2 in order to turn on the switch SWc2, and the power voltage VDD is applied to the gate of the switch SWc2 in order to turn the switch SWc2 into electrically non-conductive state (OFF state). This is because the switch SWc2 is composed of an N-chMOS transistor that connects the node Nb of the capacitive element C2 and the output terminal OUT. FIG. 2 shows the voltage levels used to turn the N-chMOS switches SWd2, SWc1 and SWd1 into electrically conductive/non-conductive states (ON/OFF states). VSS indicates the ground voltage.

FIG. 2 shows the electrically conductive/non-conductive states (ON/OFF states) of the switch SWd2. FIG. 2 shows the electrically conductive/non-conductive states (ON/OFF states) of the switch SWc1. FIG. 2 shows the electrically conductive/non-conductive states (ON/OFF states) of the switch SWd1.

FIG. 2 shows the waveform of the clock signal CLK1. FIG. 2 shows the voltage waveform of the clock signal CLK2.

Figure 3A:
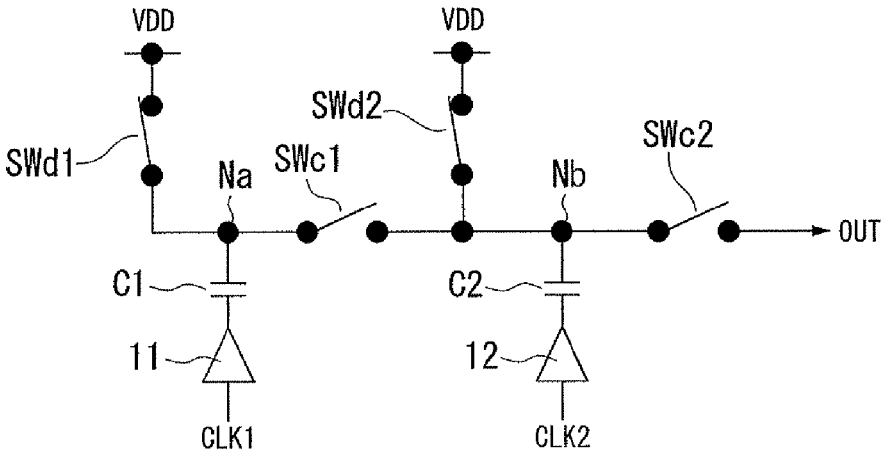
FIG. 3A is a circuit diagram illustrating the precharge of switches of the charge pump circuit of FIG. 1A in a time period Tpre1.

As shown in the timing chart of FIG. 2, during the initial precharge period Tpre1 defined from the time t1 to the time t2, the switch SWc2 is turned into electrically non-conductive state (OFF state), the switches SWd1 and SWd2 are turned into electrically conductive state (ON state), and the switch SWc1 is turned into electrically non-conductive state (OFF state). FIG. 3A shows the electrically conductive/non-conductive states (ON/OFF states) of the switches during the initial precharge period Tpre1 defined from the time t1 to the time t2.

As shown in FIG. 3A, during the initial precharge period Tpre1 defined from the time t1 to the time t2, the switch SWd1 is turned into electrically conductive state (ON state), and the node Na of the first-stage capacitive element C1 is precharged with the power voltage VDD.

In addition, during the initial precharge period Tpre1, the switch SWd2 is turned into electrically conductive state (ON state) and the node Nb of the second-stage capacitive element C2 is precharged with the power voltage VDD. These states are represented by the waveforms of the voltages of the nodes Na and Nb during the initial precharge period Tpre1 defined from the time t1 to the time t2 in FIG. 2, and the nodes Na and Nb are precharged with the power voltage VDD.

As such, during the initial precharge period Tpre1 defined from the time t1 to the time t2, the capacitive elements C1 and C2 used to boost the voltage are precharged with the power voltage VDD by the corresponding precharge paths (the switch SWd1 and the switch SWd2). In this way, the capacitive elements C1 and C2 are charged by the corresponding precharge paths. Therefore, it is possible to charge the capacitive elements C1 and C2 with the power voltage VDD.

Therefore, in the charge pump circuit according to this embodiment, it is possible to charge the second-stage capacitive element C2 similar to the first-stage capacitive element C1 with the power voltage VDD during the initial precharge period Tpre1, as compared to the charge pump circuit according to the related art shown in FIG. 6. That is, in the charge pump circuit according to this embodiment, it is possible to charge the capacitive elements C1 and C2 while improving current supply efficiency.

Therefore, in the charge pump circuit according to this embodiment, when charge pumping is performed from the first-stage capacitive element C1 to the second-stage capacitive element C2, the charge pumping can start with the potential of the capacitive element C2 higher than that in the charge pump circuit according to the related art shown in FIG. 6. As a result, it is possible to improve pumping efficiency.

Figure 3B:
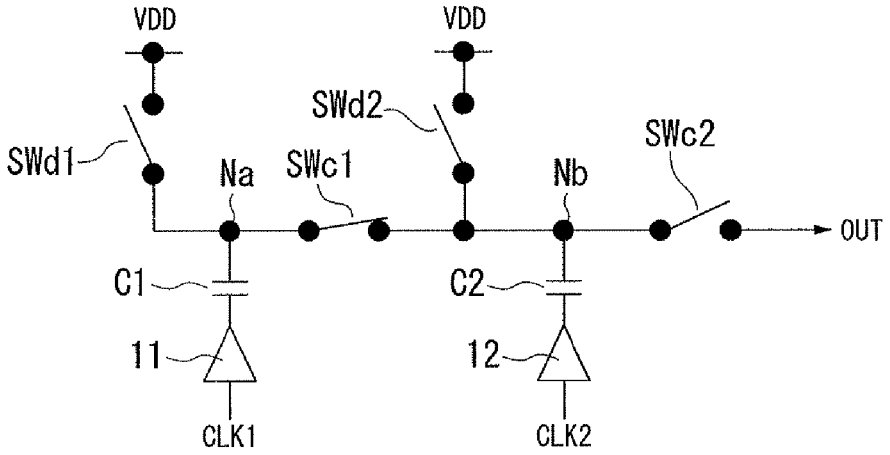
FIG. 3B is a circuit diagram illustrating the precharge of switches of the charge pump circuit of FIG. 1A in a time period Tpre2.

Then, when the initial precharge period Tpre1 defined from the time t1 to the time t2 ends, the next precharge period Tpre2 defined from the time t3 to the time t4 starts. As shown in the timing chart of FIG. 2, during the next precharge period Tpre2 defined from the time t3 to the time t4, the switch SWc2 is turned into electrically non-conductive state (OFF state), the switch SWd2 is turned into electrically non-conductive state (OFF state), the switch SWc1 is turned into electrically conductive state (ON state), and the switch SWd1 is turned into electrically non-conductive state (OFF state). FIG. 3B shows the electrically conductive/non-conductive states (ON/OFF states) of the switches during the next precharge period Tpre2 defined from the time t3 to the time t4.

During the next precharge period Tpre2 defined from the time t3 to the time t4 shown in FIG. 3B, the output of the buffer circuit 11 is at an "H" level, that is, the level of the power voltage VDD. Therefore, as shown in the waveform of the voltage of the node Na in FIG. 2, at the time t3, the voltage of the node Na is increased to a voltage obtained by adding the charge voltage (the level of the power voltage VDD) of the capacitive element C1 and the output voltage (the level of the power voltage VDD) of the buffer circuit 11, that is, to a value close to a voltage that is two times the power voltage VDD. Then, a charge current flows from the node Na of the capacitive element C1 to the node Nb of the capacitive element C2 through the switch SWc1. Therefore, after the time t3, the voltage of the node Na is gradually reduced. Meanwhile, the voltage of the node Nb of the capacitive element C2 starts to increase at the time t3, as shown in the waveform of the voltage of the node Nb in FIG. 2.

Then, when the switch SWc1 is turned into electrically non-conductive state (OFF state) at the time t4, the node Na and the node Nb are disconnected from each other, and a voltage Vpre charged by the capacitive element C1 remains at the node Nb of the capacitive element C2, wherein the voltage Vpre in the waveform of the voltage of the node Nb is shown in FIG. 2. The precharge voltage Vpre of the capacitive element C2 is higher than the power voltage VDD by a voltage level charged by the capacitive element C1. In this way, charge pumping from the capacitive element C1 to the capacitive element C2 is completed.

When the capacitance of the capacitive element C1 is C1 and the capacitance of the capacitive element C2 is C2, the level of the precharge voltage Vpre is substantially represented by the following expression:

$$Vpre=VDD\times(C2+2\times C1)/(C1+C2).$$

In the expression, since C2>0 and C1>0, the value of (C2+2×C1)/(C1+C2) is greater than 1. Therefore, the precharge voltage Vpre is higher than the power voltage VDD.

After the precharge of the capacitive element C2 with the power voltage VDD and the precharge by charge pumping from the capacitive element C1 to the capacitive element C2 are completed during the initial precharge period Tpre1 and the next precharge period Tpre2, the discharge period Tdis starts at the time t5.

Figure 3C:
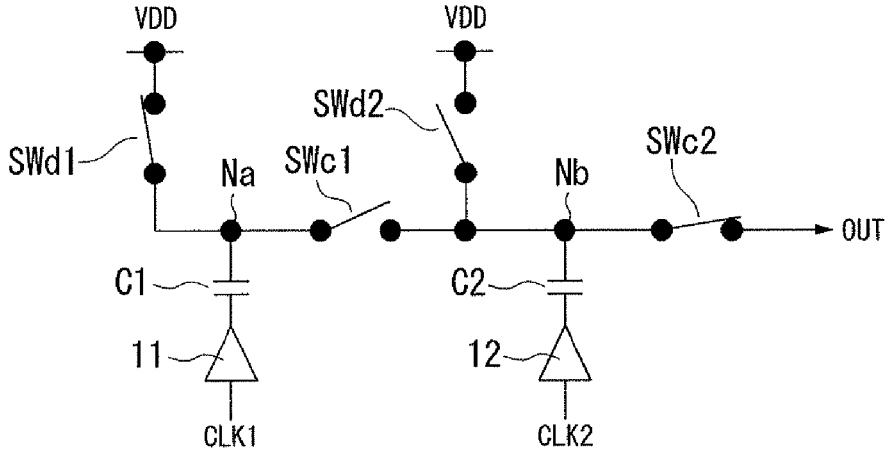
FIG. 3C is a circuit diagram illustrating the discharge of the charge pump circuit of FIG. 1A in a time period Tdis.

As shown in the timing chart of FIG. 2, during the discharge period Tdis (from the time t5 to a time t6), the switch SWc2 is turned into electrically conductive state (ON state), the switch SWd2 is turned into electrically non-conductive state (OFF state), the switch SWc1 is turned into electrically non-conductive state (OFF state), and the switch SWd1 is turned into electrically conductive state (ON state). FIG. 3C shows the electrically conductive/non-conductive states (ON/OFF states) of the switches during the discharge period Tdis defined from the time t5 to the time t6.

During the discharge period Tdis defined from the time t5 to the time t6 shown in FIG. 3C, since the clock signal CLK2 is at an "H" level (high level), the output of the buffer circuit 12 is at an "H" level, that is, the level of the power voltage VDD. Therefore, as shown in the waveform Nb of the voltage of the node Nb in FIG. 2, the voltage of the node Nb is increased to the voltage VPP which is obtained by adding the charge voltage Vpre of the capacitive element C2 and the output voltage (the level of the power voltage VDD) of the buffer circuit 12 at the time t5. The voltage VPP is output to the output terminal OUT through the switch SWc2. In addition, during the discharge period Tdis defined from the time t5 to the time t6, the switch SWd1 is turned into electrically conductive state (ON state), and the node Na of the capacitive element C1 is charged with the power voltage VDD.

At the time t6, the switch SWc2 is turned into electrically non-conductive state (OFF state) and the discharge period Tdis ends. Thereafter, the operation is repeatedly performed from the initial precharge period Tpre1.

As such, the charge pump circuit according to this embodiment of the invention includes two precharge paths (the switch SWd1a and the switch SWd2) that precharge the capacitive element C1 and the capacitive element C2 with the power voltage VDD during the initial precharge period Tpre1.

That is, in the charge pump circuit 1 according to this embodiment, when the precharge operation starts, the capacitive element C2 is precharged with the power voltage VDD of the power supply by the precharge path including the switch SWd2. Since the precharge path directly precharges the capacitive element with the power voltage of the power supply, it has a high current efficiency. Then, charge pumping from the capacitive element C1 to the capacitive element C2 is performed by a high voltage generation precharge path including the switch SWc1.

As such, after the capacitive element C2 is precharged with the power voltage VDD by the precharge path with high current efficiency using the power supply VDD and the switch SWd2, charge pumping is performed by the capacitive element C1 and the switch SWc1. The pumping operation can start with the voltage level of the power voltage VDD charged by the precharge operation as the potential of the capacitive element C2. Therefore, the current efficiency of pumping to the capacitive element C2 is improved. As a result, the potential pumped to the capacitive element C2 is higher than that in the related art. In this way, it is possible to improve the current supply capability of the capacitive element C2 to the rear stage.

In the operation of the charge pump circuit 1 according to this embodiment described with reference to FIG. 2, during the discharge period Tdis and the initial precharge period Tpre1, the switch SWd1 is turned into electrically conductive state (ON state). However, during the discharge period Tdis, the switch SWd1 may be turned into electrically conductive state (ON state) to precharge the capacitive element C1 with the power voltage VDD. Therefore, during the initial precharge period Tpre1, the switch SWd1 may be turned into electrically non-conductive state (OFF state).

In the above-described embodiment, the capacitive element C1 and the capacitive element C2 have the same capacitance, but the invention is not limited thereto. The capacitive element C1 and the capacitive element C2 may have different capacitances. Even when the capacitive element C1 and the capacitive element C2 have different capacitances, the charge pump circuit 1 may be operated in the same way as that when the capacitive elements have the same capacitance. In this case, the capacitive element C2 is boosted by the capacitive element C1. Therefore, it is preferable that the capacitance of the capacitive element C1 be more than that of the capacitive element C2.

In the above-described embodiment, the parallel-type two-stage charge pump circuit 1 shown in FIG. 1A is given as an example, but the invention is not limited thereto. As shown in FIG. 1B, the n-stage (n≧2) charge pump circuit 1' may be provided. The charge pump circuit 1' shown in FIG. 1B differs from the two-stage charge pump circuit 1 shown in FIG. 1A in that it further includes capacitive elements C3, . . . , Cn, buffer circuits 13, . . . , 1n, and switches SWd3, . . . , SWdn and the clock generating unit 3 is replaced with a clock generating unit 3A that generates clock signals CLK1, CLK2, CLK3, . . . , CLKn.

In the parallel-type n-stage charge pump unit 1' shown in FIG. 1B, a precharge path 14 including switch SWd3, . . . , SWdn may be omitted, and only the first-stage precharge path (switch SWd1) and the second-stage precharge path (switch SWd2) may be provided. In addition, a precharge path including an arbitrarily selected capacitive element may be provided in addition to the precharge paths including the first-stage capacitive element C1 and the second-stage capacitive element C2.

In the charge pump circuit 1', during each initial precharge period, the first-stage capacitive element C1 and the second-stage capacitive element C2 are precharged with the power voltage VDD. In this way, it is possible to obtain the same effects as those in the charge pump circuit 1 shown in FIG. 1A. In general, in a normal operation state, the charge voltage of the capacitive elements C3, . . . , Cn is equal to or higher than the power voltage VDD. In this case, it is not necessary to use the precharge path. However, when the power supply is turned into electrically conductive state (ON state) and the charge voltage levels of the capacitive elements C3, . . . , Cn are lower than the power voltage VDD, it is possible to perform a precharge operation with the power voltage VDD. In this way, it is possible to improve the rising characteristics of an output voltage when the power supply is turned into electrically conductive state (ON state).

As described above, the charge pump circuit 1 or 1' according to this embodiment sequentially applies the clock signals CLK1, CLK2, CLK3, . . . , CLKn to a plurality of capacitive elements C1, C2, . . . , Cn that are connected in parallel to each other to perform a pumping operation, thereby generating a voltage higher than the supplied power voltage VDD. The charge pump circuit 1 or 1' includes the precharge paths (the switches SWd1 and SWd2) that precharge a plurality of capacitive elements such as the capacitive elements C1 and C2 among the capacitive elements C1, C2, . . . , Cn with the power voltage VDD.

In this way, in the charge pump circuit 1 or 1' according to this embodiment, during a precharge operation, it is possible to charge each of the capacitive elements C1 and C2 with the power voltage VDD. That is, in the charge pump circuit according to this embodiment, it is possible to precharge each capacitive element with the power voltage VDD without using the switch for pumping. Therefore, it is possible to perform a charge operation while improving the supply efficiency of current to the capacitive elements C1 and C2.

In addition, the pumping operation can start with a capacitive element with a higher potential than that in the charge pump circuit according to the related art. Therefore, it is possible to improve pumping efficiency.

Therefore, it is possible to precharge the capacitive element with high efficiency and thus increase a precharge voltage. As a result, it is possible to improve current supply capability.

The charge pump circuit 1' according to the first embodiment includes the first precharge path (switch SWd1) that precharges the first-stage capacitive element C1 among the capacitive elements with the power voltage VDD and the second precharge path (switch SWd2) that charges any one of the other capacitive elements C2, C3, . . . , Cn with the power voltage VDD when the precharge operation starts.

In this way, it is possible to start the precharge operation after the first-stage capacitive element C1 and any one of the other capacitive elements C2, C3, . . . , Cn are precharged with the power voltage VDD. Therefore, it is possible to perform a pumping operation on the capacitive elements C2, C3, . . . , Cn with high efficiency. As a result, it is possible to increase a precharge voltage using pumping and improve current supply capability.

Second Embodiment

The charge pump circuits 1 and 1' according to the first embodiment shown in FIGS. 1A and 1B are examples of the parallel-type charge pump circuit. However, in a second embodiment, an example of a serial-parallel-type charge pump circuit will be described.

Figure 4:
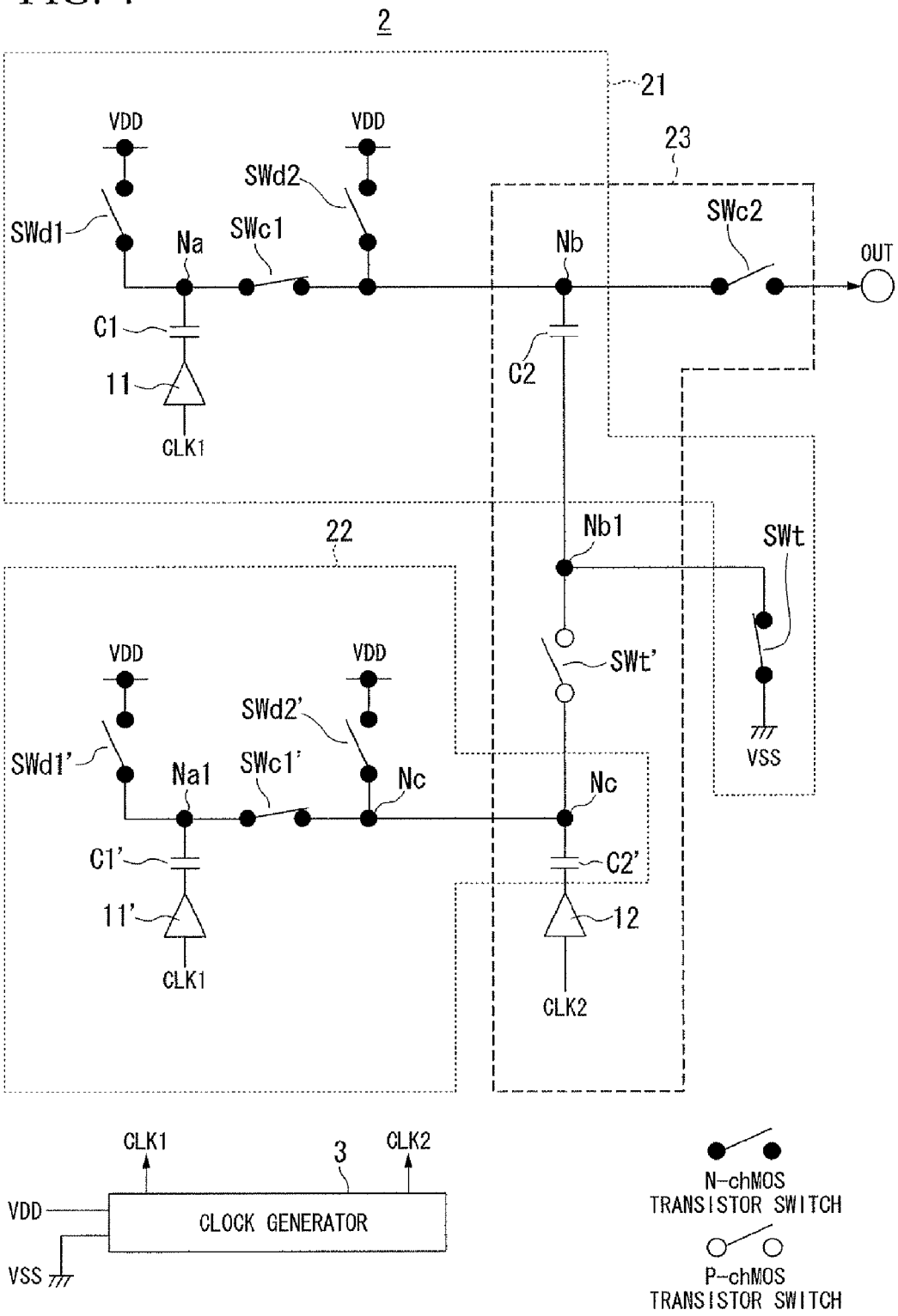
FIG. 4 is a circuit diagram illustrating the configuration of a charge pump circuit in accordance with a second preferred embodiment of the present invention.

FIG. 4 is a diagram illustrating the structure of the charge pump circuit according to the second embodiment of the invention.

First, the outline of the second embodiment will be described. A charge pump circuit 2 shown in FIG. 4 is a serial-parallel type and includes a plurality of parallel-type charge pump units 21 and 22 and a serial-type charge pump unit 23 that connects the output voltages of the charge pump units 21 and 22 in series to each other and outputs the voltage. That is, the serial-parallel-type charge pump circuit 2 according to the second embodiment is characterized in that the parallel-type charge pump units 21 and 22 are composed of the charge pump circuit 1 or 1' according to the first embodiment. Therefore, in the serial-parallel-type charge pump circuit 2, it is possible to obtain the same effects as those in the first embodiment.

The second embodiment will be described in detail. The parallel-type charge pump units 21 and 22 have the same structure as the charge pump circuit 1 shown in FIG. 1. Therefore, in the parallel-type charge pump circuits 21 and 22, a description of the same components as those in the charge pump circuit 1 shown in FIG. 1 will not be repeated.

The serial-type charge pump unit 23 includes capacitive elements C2 and C2', a buffer circuit 12, a switch SWc2, which is an N-chMOS transistor, and a switch SWt', which is a P-chMOS transistor. When one of the switch SWt', which is a P-chMOS transistor, and the switch SWt, which is an N-chMOS transistor, is turned into electrically conductive state (ON state), the other switch is turned into electrically non-conductive state (OFF state).

The capacitive element C1 performs as a first capacitor on the first stage of the plural stages. The first capacitor C1 is subjected to a first boosting. The first boosting is first one of the two boostings for all the capacitors C1 and C2 on all the stages, for example, the two stages. The first precharge path precharges the first capacitor C1 on the first stage at the power voltage.

The capacitive element C2 performs as a second capacitor on the second stage that follows to the first stage on which the capacitor C1 is provided. The second capacitor C2 is subjected to a second boosting which is later than the first boosting for the capacitor C1. The second boosting is second one of the two boostings. The second precharge path precharges the second capacitor C2 on the second stage at the power voltage.

The capacitive element C1' performs as a third capacitor on the third stage of the plural stages. The third capacitor C1' is subjected to a first boosting. The first boosting is first one of the two boostings for all the capacitors C1' and C2' on all the stages, for example, the two stages. The third precharge path precharges the third capacitor C1' on the third stage at the power voltage.

The capacitive element C2' performs as a fourth capacitor on the fourth stage that follows to the third stage on which the capacitor C1' is provided. The second capacitor C2' is subjected to a second boosting which is later than the first boosting for the capacitor C1'. The second boosting is second one of the two boostings. The fourth precharge path precharges the second capacitor C2' on the second stage at the power voltage.

If the number of stages is greater than two in the charge pump unit 21, then the first precharge path precharges the first capacitor C1 on the first stage at the power voltage by the first boosting. The first boosting is first one of the three or more boostings for all the capacitors on all the stages, for example, the three or more stages in the charge pump unit 21. In some ceases, a second precharge path precharges a second capacitor on a follower stage at the power voltage in the charge pump unit 21. The follower stage is a second or later stage in the charge pump unit 21. The second capacitor is thus provided on the follower stage that is included in the other stages than the first stage in the charge pump unit 21. In other cases, the later precharge paths sequentially precharge other capacitors than the first capacitors in the charge pump unit 21. The other capacitors than the first capacitors are provided on other stages that sequentially follow to the first capacitor in the charge pump unit 21.

If the number of stages is greater than two in the charge pump unit 22, then the third precharge path precharges the third capacitor C1' on the third stage at the power voltage by the first boosting. The first boosting is first one of the three or more boostings for all the capacitors on all the stages, for example, the three or more stages in the charge pump unit 22. In some ceases, a fourth precharge path precharges a fourth capacitor on a follower stage at the power voltage. The follower stage is a later stage than the third stage in the charge pump unit 22. The fourth capacitor is thus provided on the follower stage that is included in the other stages than the first stage in the charge pump unit 22. In other cases, the later precharge paths sequentially precharge other capacitors than the third capacitors in the charge pump unit 22. The other capacitors than the third capacitors are provided on other stages that sequentially follow to the third capacitor in the charge pump unit 22.

In the serial-type charge pump unit 23, one terminal (node Nc) of the capacitive element C2' and one terminal (node Nb1) of the capacitive element C2 are connected to each other by the switch SWt'. In addition, the other terminal of the capacitive element C2' is connected to an output terminal of the buffer circuit 12.

The clock signal CLK2 is input to the input terminal of the buffer circuit 12. In addition, the other terminal (node Nb) of the capacitive element C2 is connected to the output terminal OUT through the switch SWc2.

Figure 5:
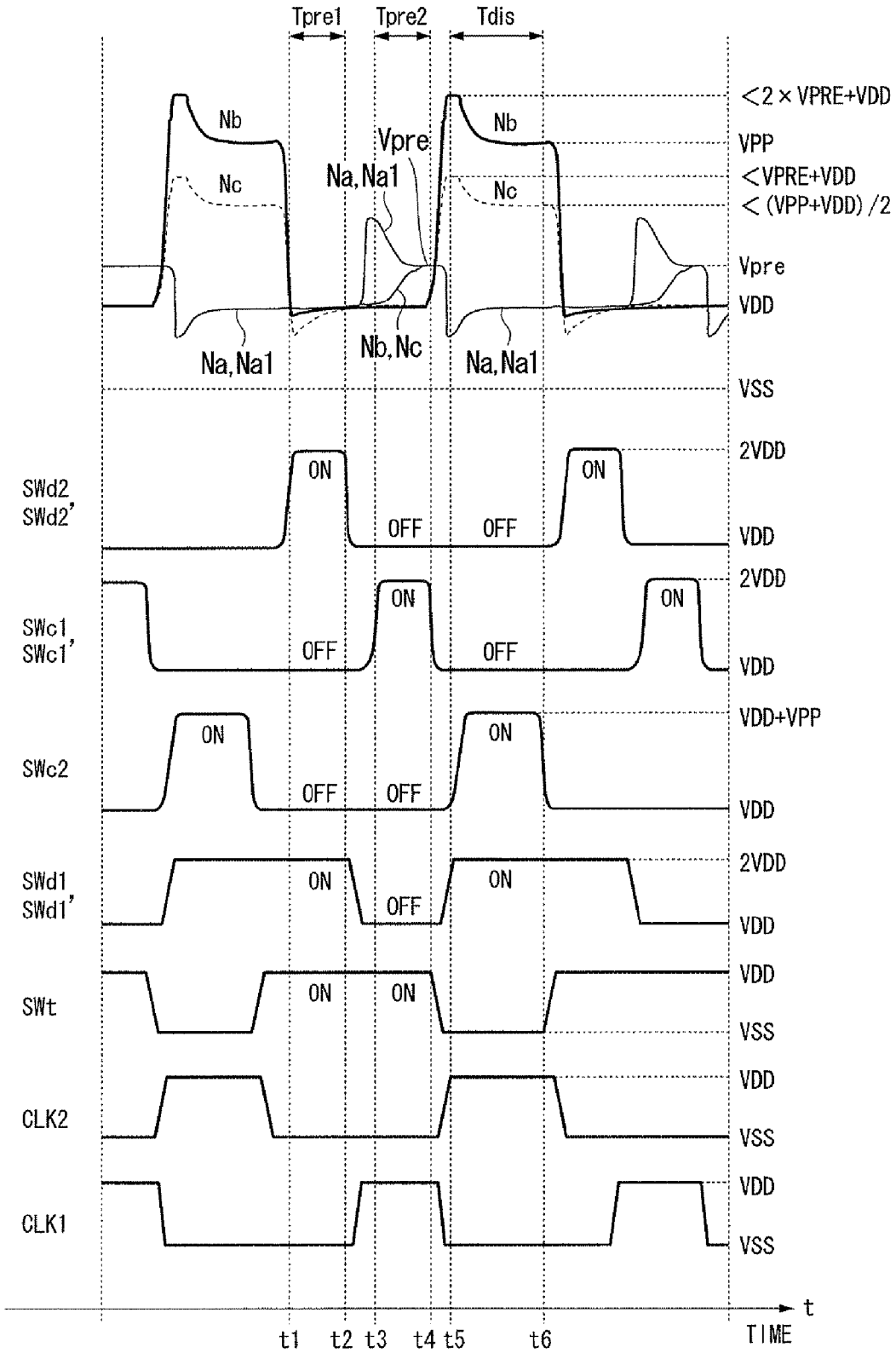
FIG. 5 is a timing chart illustrating operations of the charge pump circuit of FIG. 4.

FIG. 5 is a timing chart illustrating the operation of the charge pump circuit shown in FIG. 4. As shown in the timing chart of FIG. 5, in the charge pump circuit 2, three operation periods, that is, an initial precharge period Tpre1 defined from a time t1 to a time t2, the next precharge period Tpre2 defined from a time t3 to a time t4, and a discharge period Tdis defined from a time t5 to a time t6 are repeated to perform a voltage boosting operation.

The timing chart of FIG. 5 shows the waveforms of the voltage of a node Na of the capacitive element C1, the voltage of the node Nb of the capacitive element C2, the voltage of a node Na1 of the capacitive element C1', and the voltage of a node Nc of the capacitive element C2'. The levels of the voltage signals are shown in the right side of FIG. 5. In FIG. 5, VDD indicates a power voltage, and VSS indicates a ground voltage.

In addition, FIG. 5 shows the electrically conductive/non-conductive states (ON/OFF states) of the switch SWd2 and the switch SWd2' during each operation period. A voltage 2VDD (2×VDD) and the power voltage VDD shown on the right side of FIG. 5 indicate the voltage levels of the signals applied to the gates in order to turn the switches SWd2 and SWd2' into electrically conductive/non-conductive states (ON/OFF states). The voltage levels of the signals applied to the gates are the same as those in the timing chart shown in FIG. 2.

FIG. 5 shows the voltage levels of the signals applied to the gates in order to turn the switches, which are N-chMOS transistors, into electrically conductive/non-conductive states (ON/OFF states).

FIG. 5 shows the electrically conductive/non-conductive states (ON/OFF states) of the switch SWc1 and the switch SWc1' during each operation period. FIG. 5 shows the electrically conductive/non-conductive states (ON/OFF states) of the switch SWc2. FIG. 5 also shows the electrically conductive/non-conductive states (ON/OFF states) of the switch SWd1 and the switch SWd1'. FIG. 5 also shows the electrically conductive/non-conductive states (ON/OFF states) of the switch SWt. Although not shown in FIG. 5, the switch SWt' is turned into electrically non-conductive state (OFF state) when the switch SWt is turned into electrically conductive state (ON state) and is turned into electrically conductive state (ON state) when the switch SWt is turned into electrically non-conductive state (OFF state).

In addition, FIG. 5 shows the waveform of the clock signal CLK2. FIG. 5 shows the waveform of the clock signal CLK1. The clock signal CLK2 shown in FIG. 5 is at an "H" level during the discharge period Tdis defined from the time t5 to the time t6. The clock signal CLK1 shown in FIG. 5 is at an "H" level during the next precharge period Tpre2 defined from the time t3 to the time t4.

As shown in the timing chart of FIG. 5, during the initial precharge period Tpre1 defined from the time t1 to the time t2, the switch SWd2, the switch SWd2', the switch SWd1, the switch SWd1', and the switch SWt are turned into electrically conductive state (ON state), and the switch SWc1, the switch SWc1', and the switch SWc2 are turned into electrically non-conductive state (OFF state).

Since the switch SWd1 is turned into electrically conductive state (ON state) during the initial precharge period Tpre1 defined from the time t1 to the time t2, the node Na of the capacitive element C1 is precharged with the power voltage VDD. Since the switch SWd2 and the switch SWt are also turned into electrically conductive state (ON state), the node Nb of the capacitive element C2 is also precharged with the power voltage VDD. The node Nb takes the peak voltage which is given by 2Vpre+VDD at t5. For the time period Tdis from t5 to t6, the node Nb keeps the voltage VPP. After t6, the node Nb drops to the voltage VDD.

Similarly, since the switch SWd1' is turned into electrically conductive state (ON state) during the initial precharge period Tpre1 defined from the time t1 to the time t2, the node Na1 of the capacitive element C1' is precharged with the power voltage VDD. Since the switch SWd2' is also turned into electrically conductive state (ON state), the node Nc of the capacitive element C2' is also precharged with the power voltage VDD. The node Nc takes the peak voltage which is given by Vpre+VDD at t5. For the time period Tdis from t5 to t6, the node Nc keeps the voltage (VPP+VDD)/2. After t6, the node Nc drops to the voltage VDD.

This state is maintained during the initial precharge period Tpre1 defined from the time t1 to the time t2 in FIG. 5. As shown in FIG. 5, during the period, the levels of the voltages of the node Na, the node Nb, the node Na1, and the node Nc are substantially equal to the level of the power voltage VDD.

Then, during the precharge period Tpre2 defined from the time t3 to the time t4, as shown in the timing chart of FIG. 5, the switch SWd2, the switch SWd2', the switch SWc2, the switch SWd1, and the switch SWd1' are turned into electrically non-conductive state (OFF state). In addition, the switch SWc1, the switch SWc1', and the switch SWt are turned into electrically conductive state (ON state), and the switch SWt' is turned into electrically non-conductive state (OFF state). During this period, the clock signal CLK1 is at an "H" level.

During the precharge period Tpre2 defined from the time t3 to the time t4, the clock signal CLK1 is at an "H" level (high level), and the output of the buffer circuit 11 is at an "H" level, that is, the level of the power voltage VDD. Therefore, as shown in a waveform Na in FIG. 5, the voltage of the node Na of the capacitive element C1 is increased to a value close to a voltage (which is two times the power voltage VDD) obtained by adding the precharge voltage (the level of the power voltage VDD) of the capacitive element C1 and the output voltage (the level of the power voltage VDD) of the buffer circuit 11 at the time t3.

Then, a charge current flows from the node Na of the capacitive element C1 to the node Nb of the capacitive element C2 through the switch SWc1. Therefore, after the time t3, the voltage of the node Na is gradually reduced. Meanwhile, the voltage of the node Nb of the capacitive element C2 starts to increase at the time t3, as shown in the waveform Nb in FIG. 5. Then, at the time t4, the voltages of the node Na and the node Nb are boosted to the voltage Vpre.

When the capacitance of the capacitive element C1 is C1 and the capacitance of the capacitive element C2 is C2, the level of the precharge voltage Vpre is substantially represented by the following expression:

$$Vpre=VDD\times(C2+2\times C1)/(C1+C2).$$

In the expression, since C2>0 and C1>0, the value of (C2+2×C1)/(C1+C2) is greater than 1. Therefore, the precharge voltage Vpre is higher than the power voltage VDD.

Similarly, during the next precharge period Tpre2 (from the time t3 to the time t4), the clock signal CLK1 is at an "H" level (high level), and the output of the buffer circuit 11' is at an "H" level, that is, the level of the power voltage VDD. Therefore, as shown in the waveform Na1 in FIG. 5, the node Na1 of the capacitive element C1' is increased to a value close to a voltage (which is two times the power voltage VDD) obtained by adding the charge voltage (the level of the power voltage VDD) of the capacitive element C1' and the output voltage (the level of the power voltage VDD) of the buffer circuit 11' at the time t3.

Then, a charge current flows from the node Na1 of the capacitive element C1' to the node Nc of the capacitive element C2' through the switch SWc1'. Therefore, after the time t3, the voltage of the node Na1 is gradually reduced. Meanwhile, the voltage of the node Nc of the capacitive element C2' starts to increase at the time t3, as shown in the waveform Nc in FIG. 5. Then, at the time t4, the voltages of the node Na1 and the node Nc are boosted to the voltage Vpre.

Then, when the switch SWc1 is turned into electrically non-conductive state (OFF state) at the time t4, the node Na and the node Nb are disconnected from each other, and the voltage Vpre charged by the capacitive element C1 remains at the node Nb of the capacitive element C2. The voltage Vpre of the capacitive element C2 is higher than the power voltage VDD by a voltage level charged by the capacitive element C1. In this way, charge pumping from the capacitive element C1 to the capacitive element C2 is completed. Similarly, when the switch SWc1' is turned into electrically non-conductive state (OFF state) at the time t4, the node Na1 and the node Nc are disconnected from each other, and the voltage Vpre charged by the capacitive element C1' remains at the node Nc of the capacitive element C2'. The voltage Vpre of the capacitive element C2' is higher than the power voltage VDD by a voltage level charged by the capacitive element C1'. In this way, charge pumping from the capacitive element C1' to the capacitive element C2' is completed.

After charge pumping to the capacitive elements C2 and C2' is completed during the initial precharge period Tpre1 and the next precharge period Tpre2, the discharge period Tdis starts at the time t5.

As shown in the timing chart of FIG. 5, during the discharge period Tdis (from the time t5 to the time t6), the switch SWd2, the switch SWd2', the switch SWc1, the switch SWc1', and the switch SWt are turned into electrically non-conductive state (OFF state), and the switch SWc2, the switch SWd1, the switch SWd1', and the switch SWt' are turned into electrically conductive state (ON state). In addition, during the discharge period Tdis, the clock signal CLK2 is at an "H" level.

During the next discharge period Tdis defined from the time t5 to the time t6, the clock signal CLK2 is at an "H" level (high level), and the output of the buffer circuit 12 is at an "H" level, that is, the level of the power voltage VDD. Therefore, as shown in the waveform Nc in (1) of FIG. 5, the node Nc of the capacitive element C2' is increased to a voltage (Vpre+VDD) obtained by adding the precharge voltage Vpre of the capacitive element C2' and the output voltage (the level of the power voltage VDD) of the buffer circuit 12 after the time t5.

Then, a voltage (VPP) obtained by adding the voltage of the node Nc of the capacitive element C2' and the voltage precharged by the capacitive element C2 appears at the node Nb of the capacitive element C2. The voltage VPP is output to the output terminal OUT through the switch SWc2. In addition, during the discharge period Tdis, the switch SWd1 and the switch SWd1' are turned into electrically conductive state (ON state), and the node Na of the capacitive element C1 and the node Na1 of the capacitive element C1' are charged with the power voltage VDD.

At the time t6, the discharge period Tdis ends. Thereafter, the initial precharge period Tpre1, the next precharge period Tpre2, and the discharge period Tdis are repeated.

As such, the charge pump circuit 2 according to the second embodiment includes four precharge paths (the switches SWd1, SWd1', SWd2, and SWd2') that precharge the capacitive element C1, the capacitive element C1', the capacitive element C2, and the capacitive element C2' with the power voltage VDD during the initial precharge period Tpre1.

That is, when a precharge operation starts, the capacitive elements C2 and C2' are precharged with the power voltage VDD by the precharge paths including the switches SWd2 and SWd2', respectively. Since the precharge paths directly charge the capacitive elements with the power voltage of the power supply, they have high current efficiency. Thereafter, charge pumping from the capacitive element C1 to the capacitive element C2 and charge pumping from the capacitive element C1' to the capacitive element C2' are performed by the high voltage generation precharge paths including the switches SWc1 and SWc1' according to the related art.

As such, since the capacitive elements C2 and C2' are directly precharged with the power voltage VDD by the precharge paths including the switches SWd2 and SWd2', precharge efficiency is improved. Therefore, it is possible to increase a precharge potential and improve current supply capability, as compared to the structure in which the precharge paths including the switches SWd2 and SWd2' are not used.

As described above, the charge pump circuit 2 according to the second embodiment includes: a first charge pump unit 21 that sequentially applies clock signals to a plurality of first capacitive elements C1 and C2 which are connected in parallel to each other to perform a pumping operation, thereby generating a voltage higher than the supplied power voltage VDD; and a second charge pump unit 22 that sequentially applies clock signals to a plurality of second capacitive elements C1' and C2' which are connected in parallel to each other to perform a pumping operation, thereby generating a voltage higher than the power voltage VDD.

The charge pump circuit 2 further includes a third charge pump unit 23 that serially connects the rear-stage capacitive element C2 of the plurality of first capacitive elements C1 and C2 and the rear-stage capacitive element C2' of the plurality of second capacitive elements C1' and C2' to generate a boosted output voltage.

In the charge pump circuit 2, the first charge pump unit 21 includes precharge paths (the switches SWd1 and SWd2) that precharge a plurality of the capacitive elements C1 and C2 which are determined in advance among the respective capacitive elements C1 and C2 of the first charge pump unit 21 with the power voltage VDD, and the second charge pump unit 22 includes precharge paths (the switches SWd1', SWd2') that precharge a plurality of the capacitive elements C1 and C2 which are determined in advance among the respective capacitive elements C1' and C2' of the second charge pump unit 22 with the power voltage VDD.

In this way, in the charge pump circuit 2 according to the second embodiment, the parallel-type charge pump units 21 and 22 can precharge the capacitive elements C2 and C2' with high efficiency, similar to the first embodiment. In addition, in the charge pump circuit 2 according to the second embodiment, the third charge pump unit 23 can increase an output voltage and improve current supply capability.

In this embodiment, the charge pump circuit 2 shown in FIG. 4 that includes two parallel-type charge pump units 21 and 22 and one serial-type charge pump unit 23 is given as an example of the serial-parallel-type charge pump circuit, but the invention is not limited thereto. For example, the charge pump circuit may include three or more parallel-type charge pump units and one serial-type charge pump unit that serially connects the output voltages of the plurality of parallel-type charge pump units and pumps the voltage.

In addition, each of the parallel-type charge pump units 21 and 22 is not limited to the two-stage structure using two capacitive elements. As shown in FIG. 1B, n-stage charge pump units including n (n≥2) capacitive elements C1, C2, C3, . . . , Cn may be used.

When the n-stage charge pump units are used, at least one-stage charge pump unit among the n-stage charge pump units may have the same structure as that in the first embodiment. In this case, it is possible to obtain the same effects as those in the first embodiment from the stage having the same structure as that in the first embodiment.

The charge pump circuit shown in FIG. 1A, 1B, or 4 may be used for a circuit that generates a voltage which is higher than a power voltage supplied from the outside to, for example, a semiconductor memory device and is applied to the word line.

In accordance with the above-described embodiments, the positive voltage is generated with the precharge voltage VDD. The above embodiments can be applied to other case where the negative voltage is generated with the precharge voltage VSS or the ground voltage.

It is apparent that the present invention is not limited to the above embodiments, but may be modified and changed without departing from the scope and spirit of the invention.

What is claimed is:

1. A charge pump circuit comprising:

*a first charge pump circuit comprising:* a first plurality of capacitors that are connected in parallel to each other, the first plurality of capacitors receiving clock signals to perform sequentially pumping operations which generate a first higher voltage from a power voltage supplied *at a first output node*; *and* a first precharge circuit that precharges a first predetermined number of capacitors in the first plurality of capacitors at the power voltage;

*a second charge pump circuit comprising:* a second plurality of capacitors that are connected in parallel to each other, the second plurality of capacitors receiving clock signals to perform sequentially pumping operations which generate a second higher voltage from the power voltage *at a second output node*; *and* a second precharge circuit that precharges a second predetermined number of capacitors in the second plurality of capacitors at the power voltage; and a series connection path that connects in series between [a] *the* first output node [of the first precharge circuit] and [a] *the* second output node [of the second precharge circuit],

*wherein when the first output node and the second output node are connected in series via the series connection path, a final capacitor of the first plurality of capacitors is connected in the series connection path between the first output node and the second output node,* wherein the first predetermined number is greater than one, and wherein the second predetermined number is greater than one.

2. The charge pump circuit according to claim 1, wherein the first precharge circuit comprises:

a first precharge path that precharges a first capacitor on a first stage at the power voltage, the first capacitor being included in the first plurality of capacitors which are each provided on different stages, the first stage being included in the different stages, the first capacitor being subjected to a first boosting, the first boosting being *the* first one of boostings for all capacitors included in the first plurality of capacitors; and a second precharge path that precharges a second capacitor on a follower stage at the power voltage, the follower stage being a second or later stage, wherein the second precharge circuit comprises:

a third precharge path that precharges a third capacitor on a third stage at the power voltage, the third capacitor being included in the second plurality of capacitors which are each provided on different stages, the third stage being included in the different stages, the third capacitor being subjected to a first boosting, the first boosting being *the* first one of boostings for all capacitors included in the second plurality of capacitors; and a fourth precharge path that precharges a fourth capacitor on a second follower stage at the power voltage, the second follower stage being a second or later stage.

3. The charge pump circuit according to claim 1, wherein the first precharge circuit comprises:

a first precharge path that precharges a first capacitor on a first stage at the power voltage, the first capacitor being included in the first plurality of capacitors which are each provided on different stages, the first stage being included in the different stages, the first capacitor being subjected to a first boosting, the first boosting being *the* first one of boostings for all capacitors included in the first plurality of capacitors; and a first later precharge path that sequentially precharges other capacitors than the first [capacitors] *capacitor*, the other capacitors being provided on other stages that sequentially follow to the first stage, wherein the second precharge circuit comprises:

a third precharge path that precharges a third capacitor on a third stage at the power voltage, the third capacitor being included in the second plurality of capacitors which are each provided on different stages, the third stage being included in the different stages, the third capacitor being subjected to a first boosting, the first boosting being first one of boostings for all capacitors included in the second plurality of capacitors; and a *second* later precharge path that sequentially precharges other capacitors than the third [capacitors] *capacitor*, the other capacitors being provided on other stages that sequentially follow to the third capacitor.

4. The charge pump circuit according to claim 2, wherein the first precharge path comprises:

a first node coupled to the first capacitor; and a first switch between the first node and a power supply that supplies the power voltage, wherein the second precharge path comprises:

a second node coupled to the second capacitor; and a second switch between the second node and the power supply, wherein the third precharge path comprises:

a third node coupled to the third capacitor; and a third switch between the third node and the power supply, and wherein the fourth precharge path comprises:

a fourth node coupled to the fourth capacitor; and a fourth switch between the fourth node and the power supply.

5. The charge pump circuit according to claim 2, further comprising:

a clock generator that generates first and second clocks, the clock generator sequentially supplying the first and second clocks to the first and second capacitors respectively, and the clock generator sequentially supplying the first and second clocks to the third and fourth capacitors respectively.

6. A charge pump circuit comprising:

*an output terminal;* a first charge pump circuit that comprises: a first plurality of capacitors that are connected in parallel to each other, the first plurality of capacitors receiving *one or more* clock signals to perform sequentially pumping operations which generate a first higher voltage from a power voltage supplied;

a second charge pump circuit that comprises: a second plurality of capacitors that are connected in parallel to each other, the second plurality of capacitors receiving *one or more* clock signals to perform sequentially pumping operations which generate a second higher voltage from the power voltage; and a third charge pump circuit *comprising a switch* that, *when activated,* connects in series a first [final] stage capacitor on [the] *a* final stage of the first plurality of capacitors to a [second] final stage capacitor on [the] *a* final stage of the second plurality of capacitors,

*wherein the final stage capacitor of the second plurality of capacitors is not connected to the output terminal of the charge pump circuit when the switch is inactivated,* wherein at least one of the first and second charge pump circuits comprises a precharge circuit that precharges a predetermined number of capacitors at the power voltage, the predetermined number of capacitors are included in the at least one of the first and second charge pump circuits, *and* wherein the predetermined number is greater than one.

7. The charge pump circuit according to claim 6, wherein the precharge circuit comprises:

a first precharge path that precharges a first capacitor on the first stage of the capacitors at the power voltage; and a second precharge path that precharges a second capacitor on a follower stage at the power voltage, the follower stage being a second or later stage.

8. The charge pump circuit according to claim 7, further comprising:

a clock generator that generates first and second clocks, the clock generator sequentially supplying the first and second clocks to the first and second capacitors respectively.

9. A charge pump circuit comprising:

a first switch connected between a first power line and a first node;

a first capacitor connected between the first node and a first clock supply node;

a second switch connected between the first node and a second node;

a third switch connected between the first power line and the second node;

a second capacitor connected between the second node and a second clock supply node;

a fourth switch connected between the second node and a third node;

a series circuit that comprises a fifth switch and a third capacitor which are connected in series between the second capacitor and the second clock supply node;

a sixth switch connected between a first connecting node and a second power line, the first connecting node being between the second capacitor and the series circuit;

a seventh switch connected between the first power line and a fourth node;

a fourth capacitor connected between the fourth node and the first clock supply node;

an eighth switch connected between the fourth node and a second connecting node, the second connecting node being between the fifth switch and the third capacitor; and a ninth switch connected between the first power line and the second connecting node.

10. The charge pump circuit according to claim 9, further comprising:

a clock generator that generates first and second clocks, the clock generator sequentially supplying the first and second clocks to the first and second clock supply nodes respectively.

11. The charge pump circuit according to claim 10, wherein in pre-charging the first and second capacitors with a voltage of the first power line, the first and third switches are in electrically conductive state, and the second and fourth switches are in electrically non-conductive state, and the clock generator sets the first and second clock signals at a first voltage level which does not rise the voltages across each capacitor of the first to fourth capacitors, each capacitor being supplied with the first or second clock signal;

in pumping from the first capacitor to the second capacitor, the first, third and fourth switches are in electrically non-conductive state, the second switch is in electrically conductive state, and the clock generator sets the first clock signal at a second voltage level which rises the voltages across each capacitor of the first to fourth capacitors, each capacitor being supplied with the first or second clock signal, and the clock generator sets the second clock signal at the first voltage level; and in discharging from the second capacitor, the first and fourth switches are in electrically conductive state, the second and third switches are in electrically non-conductive state, and the clock generator sets the first clock signal at the first voltage level, and the clock generator sets the second clock signal at the second voltage level.

12. The charge pump circuit according to claim 10, wherein in pre-charging the first, second, third and fourth capacitors with a voltage of the first power line, the first, third, sixth, seventh and ninth switches are in electrically conductive state, and the second, fourth, fifth and eighth switches are in electrically non-conductive state, and the clock generator sets the first and second clock signals at a first voltage level which does not rise the voltages across each capacitor of the first to fourth capacitors, each capacitor being supplied with the first or second clock signal;

in pumping from the first capacitor to the second capacitor and also pumping from the fourth capacitor to the second capacitor, the first, third, fourth, fifth, seventh and ninth switches are in electrically non-conductive state, the second, sixth and eighth switches are in electrically conductive state, and the clock generator sets the first clock signal at a second voltage level which rises the voltages across each capacitor of the first to fourth capacitors, each capacitor being supplied with the first or second clock signal, and the clock generator sets the second clock signal at the first voltage level; and in discharging from the second capacitor, the first, fourth, fifth and seventh switches are in electrically conductive state, the second, third, sixth, eighth and ninth switches are in electrically non-conductive state, and the clock generator sets the first clock signal at the first voltage level, and the clock generator sets the second clock signal at the second voltage level.

*13. A charge pump circuit comprising:*

*a first charge pump circuit comprising a first plurality of capacitors that are precharged to a power supply voltage, the first plurality of capacitors receiving one or more clock signals to perform sequentially pumping operations which generate a first higher voltage from the power supply voltage at an output node in a final stage of the first charge pump circuit that includes a final stage capacitor having a first terminal connected to the output node in the final stage of the first charge pump circuit;*

*a second charge pump circuit comprising a second plurality of capacitors that are precharged to the power supply voltage, the second plurality of capacitors receiving one or more clock signals to perform sequentially pumping operations which generate a second higher voltage from the power supply voltage at an output node in a final stage of the second charge pump circuit that includes a final stage capacitor having a first terminal connected to the output node in the final stage of the second charge pump circuit; and*

*a third charge pump circuit that connects in series a second terminal of the final stage capacitor of the first charge pump to the output node in the final stage of the second charge pump circuit.*

*14. The charge pump circuit of claim 13, wherein each of the first charge pump circuit and the second charge pump circuit further comprise a first stage capacitor precharged to the power supply voltage through a first switch, a second stage capacitor precharged to the power supply voltage through a second switch, and a third switch connecting the first stage capacitor to the second stage capacitor.*

*15. The charge pump circuit of claim 14, wherein the second stage capacitor of each of the first charge pump circuit and the second charge pump circuit is the final stage capacitor of respective first and second charge pump circuits.*

*16. The charge pump circuit of claim 14, wherein the first, second, and third switches are transistors.*

*17. The charge pump circuit of claim 16, wherein the transistors are n-channel transistors.*

*18. The charge pump circuit of claim 13, wherein the final stage capacitor on the final stage of the first plurality of capacitors and the final stage capacitor on the final stage of the second plurality of capacitors are connected in series through a first transistor.*

*19. The charge pump circuit of claim 18, wherein the first transistor is a p-channel transistor.*

*20. The charge pump circuit of claim 18, wherein the final stage capacitor on the final stage of the first plurality of capacitors is connected to an output terminal through a second transistor.*

*21. The charge pump circuit of claim 20, wherein the second transistor is an n-channel transistor.*

*22. The charge pump circuit of claim 1, wherein, when connected in the series connection path, the final capacitor*

*of the first plurality of capacitors has a first terminal connected to the first output node and a second terminal connected to the second output node.*

*23. The charge pump circuit of claim 6, wherein the final stage capacitor of the first plurality of capacitors is connectable to the output terminal of the charge pump circuit regardless of whether the switch is activated or inactivated.*

* * * * *